(12) United States Patent
Berland et al.

(10) Patent No.: US 10,681,110 B2
(45) Date of Patent: Jun. 9, 2020

(54) OPTIMIZED STREAM MANAGEMENT (71) Applicant: RADWARE, LTD., Tel Aviv (IL)

(72) Inventors: Roy Berland, Tel Aviv (IL); Elad Grupi, Tel Aviv (IL)

(73) Assignee: RADWARE, LTD., Tel Aviv (IL)

(*) Notice: Subject to any disclaimer, the term of this patent is extended or adjusted under 35 U.S.C. 154(b) by 368 days.

(21) Appl. No.: 15/146,315

(22) Filed: May 4, 2016

(65) Prior Publication Data

US 2017/0324677 A1    Nov. 9, 2017

(51) Int. Cl.
*H04L 12/927* (2013.01)
*H04L 29/08* (2006.01)

(52) U.S. Cl.
CPC ............ *H04L 67/02* (2013.01); *H04L 47/805* (2013.01)

(58) Field of Classification Search
None
See application file for complete search history.

(56) References Cited

U.S. PATENT DOCUMENTS

| 8,144,584 | B1* | 3/2012 | Voruganti | H04L 47/522 |
| | | | | 370/232 |
| 2002/0161914 | A1* | 10/2002 | Belenki | H04L 47/10 |
| | | | | 709/235 |
| 2003/0236904 | A1* | 12/2003 | Walpole | H04L 12/1881 |
| | | | | 709/231 |
| 2006/0253465 | A1* | 11/2006 | Willis | G06F 17/2247 |
| 2008/0310391 | A1* | 12/2008 | Schneidman | H04L 47/10 |
| | | | | 370/349 |
| 2015/0271233 | A1 | 9/2015 | Bouazizi | |
| 2016/0100332 | A1 | 4/2016 | Yi et al. | |
| 2016/0105374 | A1 | 4/2016 | Thackray et al. | |

FOREIGN PATENT DOCUMENTS

WO    2016046204 A1    3/2016

OTHER PUBLICATIONS

Belshe et al., (Belshe), "Hypertext Transfer Protocol Version 2 (HTTP/2)", May 2015, NPL (of IDS filed May 4, 2016), ISSN: 2070-1721, (p. 1-44).*
Belshe, et al., "Hypertext Transfer Protocol Version 2 (HTTP/2)," an Abstract, Internet Engineering Task Force (IETF), 2005, ISSN: 2070-1721, URL: https://tools.ietf.org/html/rfc7540, Intro (pp. 4-5) and Section 5.3 (pp. 25-28).

* cited by examiner

*Primary Examiner* — James A Edwards
(74) *Attorney, Agent, or Firm* — M&B IP Analysts, LLC (57) ABSTRACT

A system and method for optimized stream management are provided. The method includes retrieving priority data; determining, in real-time, a current priority tree based on the retrieved priority data, wherein the priority tree includes at least one node representing a stream; identifying, based on the retrieved priority data, at least one relative weight of the at least one node; determining an effective weight based on each identified relative weight; and filling a buffer based on the current priority tree and the at least one effective weight.

21 Claims, 6 Drawing Sheets

OPTIMIZED STREAM MANAGEMENT

TECHNICAL FIELD

The present disclosure relates generally to enabling efficient HTTP/2 communication, and more particularly to optimizing prioritization of resource delivery for nodes of a priority tree.

BACKGROUND

Hypertext Transfer Protocol version 2 (HTTP/2) is a new version of the HTTP network protocol used by the World Wide Web. HTTP/2 is based on SPDY® which is an open networking protocol for transporting web content with goals of reducing web page load latency and improving web security.

SPDY® and its successor the HTTP/2 are open networking protocols for transporting web content with goals of reducing web page load latency and improving web security. This reduced latency is achieved by via compression, multiplexing, and prioritization of webpage sub-resources across a single connection per client.

To improve performance, the HTTP/2 RFC 7540 published in May 2015 (ISSN: 2070-1721) features stream prioritization management (for example, section 5.3 of the RFC 7540). This prioritization management provides a way to share limited system resources among parallel resource requests and responses. The algorithm provided for the prioritization management details how to satisfy a client's preferred prioritization and how to proceed when any or all of the preferred prioritizations cannot be satisfied at a given time.

The resource prioritization provided by HTTP/2 utilizes a tree data structure to specify priority. The priority tree orders streams based on dependencies. Nodes in the tree are processed according to their level or depth in the tree. Each stream may be a "child" stream that is dependent on another stream (referred to as the "parent"). The children are dependent on their parents such that each parent must be processed before its children.

Among children at the same level in the tree (i.e., "brothers"), relative weights may be assigned and utilized to determine the relative amount of resources to be allocated to each stream at the level, with the processing order of the brothers being arbitrarily assigned. Additionally, a stream in a priority tree may be exclusive, i.e., the only stream that depends immediately from its parent. If a stream is exclusive, other streams that would be dependent on the same parent instead become dependent on the exclusive stream.

Accordingly, each stream may be assigned a PRIORITY frame providing its stream dependency (i.e., its parent), its weight (relative to its brothers), and whether the stream is exclusively dependent. When no prioritization scheme is specified, default settings may be utilized. For example, all streams may initially be assigned a non-exclusive dependency on a root stream 0x0 with a default weight of 16.

If a new PRIORITY frame having priority data for an existing stream in the priority tree is provided, the existing stream (and any dependent streams) may be reprioritized accordingly by changing, e.g., the dependency, weight, or exclusivity. This reprioritization therefore affects the structure of the priority tree.

Streams having the same depth or level (hereinafter "degree relative" streams) within a priority tree may be considered to be related by degree. Degree relative streams do not necessarily share the same parent, but they are separated from the root node by the same degree. Additionally, the parents of degree relative streams are themselves degree relative streams. When allocating resources to nodes in the tree (e.g., when a buffer is created and needs to be allocated), the resources may be initially allocated to streams in a current set of degree relative streams. The current set of degree relative streams typically includes all degree relative streams in the first level of the priority tree having available nodes.

According to the HTTP/2 RFC, when a blocked stream is encountered, the resources allocated to the blocked stream should be reallocated and split among its children according to their relative weights. Additionally, the RFC suggests keeping track of genealogy among nodes in the tree at all times during streaming. This may increase computing resource usage and/or slow down streaming.

Figure 1:
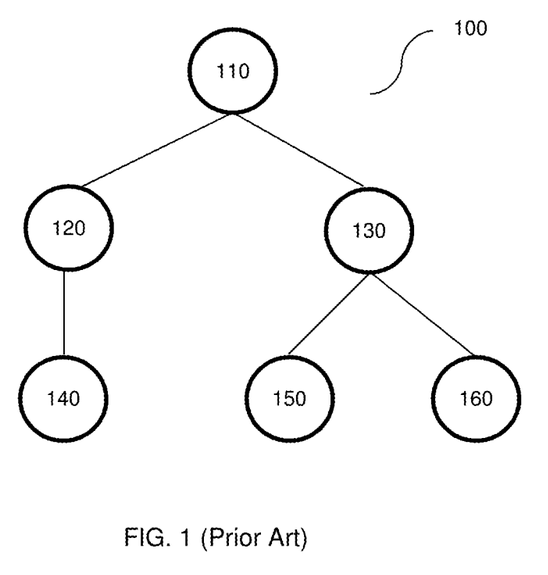
FIG. 1 is an example priority tree utilized to demonstrate the relationships between degree relative streams.

FIG. 1 is an example priority tree 100 utilized to demonstrate the relationships between degree relative streams. The example priority tree 100 includes a root node 110, two immediate children nodes 120 and 130, and three indirectly dependent nodes 140, 150, and 160. The nodes 120 and 130 are first degree relative streams, i.e., they are related in that each is immediately dependent on the root node 110. The nodes 140, 150, and 160 are second degree relative streams, i.e., they are related in that each is indirectly dependent on the root node 110 through one parent.

The weight initially assigned to each stream (e.g., via a HEADERS or PRIORITY frame as defined in the HTTP/2 RFC) is a relative weight indicating the amount of resources to be assigned to the stream relative to other streams. For example, in the tree 100, if nodes 120 and 130 have relative weights 16 and 32, respectively, then node 120 will carry $16/(16+32)=\frac{1}{3}$ of the resources and node 130 will carry $32/(16+32)=\frac{2}{3}$ of the resources.

The HTTP/2 RFC does not define a scheme for prioritization management that can dynamically and easily adapt to changing real world circumstances. For example, the HTTP/2 RFC does not define how the prioritization management should adapt the priorities when nodes of the tree are blocked, closed, missing a parent, or otherwise unavailable. The lack of an easy-to-adapt priority mechanism when transferring data using HTTP/2 may result in requiring feature data from backend servers, thereby slowing down resource retrieval and rendering of content (e.g. webpages) on web browsers.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The embodiments disclosed herein include a method for optimized stream management. The method comprises: retrieving priority data; determining, in real-time, a current priority tree based on the retrieved priority data, wherein the priority tree includes at least one node representing a stream; identifying, based on the retrieved priority data, at least one relative weight of the at least one node; determining an effective weight based on each identified relative weight; and filling a buffer based on the current priority tree and the at least one effective weight.

The embodiments disclosed herein also include a system for optimized stream management. The system comprises: a processing unit; and a memory, the memory containing instructions that, when executed by the processing unit, configure the system to: retrieve priority data; determine, in real-time, a current priority tree based on the retrieved priority data, wherein the priority tree includes at least one node representing a stream; identify, based on the retrieved priority data, at least one relative weight of the at least one node; determine an effective weight based on each identified relative weight; and fill a buffer based on the current priority tree and the at least one effective weight

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for optimized stream management. The optimized stream management is utilized to ensure optimal prioritization even when resources are blocked or otherwise unavailable. In an embodiment, a priority tree is manipulated based on circumstances such as blocking or closing of nodes, amounts of information sent via streams, and the like. The manipulation of the priority tree allows for optimized stream management that adapts to changes in the tree.

Figure 2:
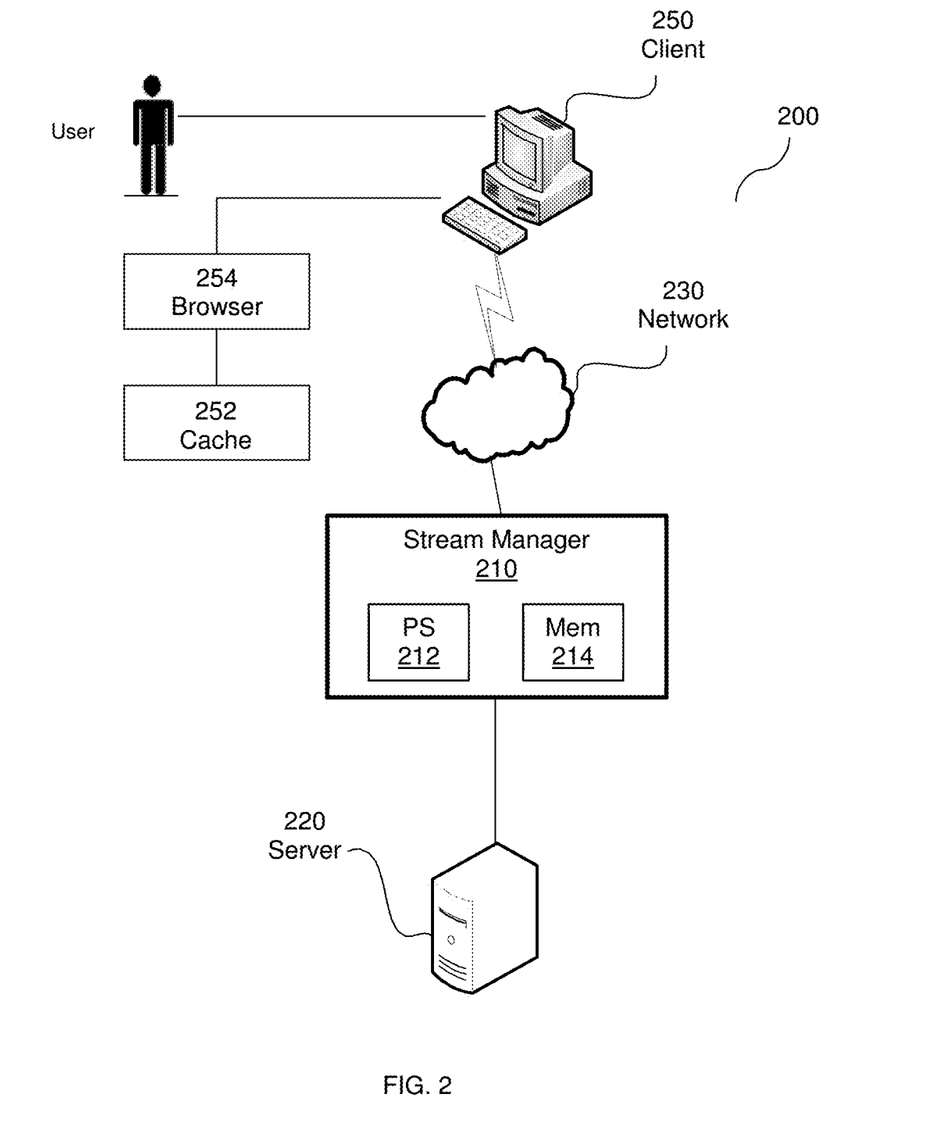
FIG. 2 is a network diagram utilized to describe the various disclosed embodiments.

FIG. 2 shows an exemplary and non-limiting network diagram 200 utilized to describe the various disclosed embodiments. As depicted in FIG. 2, a stream management unit 210 is positioned between a server 220 and a client device (client) 250. The server 220 may be an HTTP server, a web server, or any other server. The client device 250 may be an HTTP client or any other electronic device capable of sending and receiving content over a network 230. The network 230 may be the Internet or any other network that enables communication among two or more electronic devices. The network 230 may be implemented using well-known network protocols such as hypertext transfer protocol (HTTP), HTTP 2.0, secure hypertext transfer protocol (HTTPS), transmission control protocol/Internet protocol (TCP/IP), and the like. In some embodiments, secure access to the network 230 may be facilitated via well-known techniques such as a Virtual Private Network (VPN), although such secure access is not required.

The client device 250 may be a computer or any other electronic device. Examples include, without limitation, a desktop computer, laptop computer, personal digital assistant (PDA), cellular telephone, smartphone, music player, handheld computer, tablet computer, kiosk, game system, enterprise computing system, server computer, and the like. In one embodiment, the client device 250 includes a local cache 252, which can be used for storing resources retrieved from the server 220 for later use. The cache 252 can be implemented at the client 250 according to well-known methods. The resources may include, for example, CSS files, images or any other type of multimedia content, script files, HTLM documents, and the like.

In one embodiment, the client 250 and/or server 220 each include a number of hardware components as are well known to those skilled in the art, including for example one or more input devices (such as a keyboard, mouse, touchscreen, trackball, trackpad, five-way switch, voice input device, joystick, and/or any combination thereof), one or more output devices (such as a screen, speaker, printer, and/or any combination thereof), one or more processors (which can be a conventional microprocessor for performing operations on data under the direction of software, according to well-known techniques), memory (such as random-access memory having a structure and architecture as are known in the art, for use by the one or more processors in the course of running software), and/or local storage (which can be any magnetic, optical, and/or electrical storage device for storage of data in digital form, such as flash memory, magnetic hard drive, CD-ROM, and/or the like). Such components are well known in the art of computing architecture and are thus omitted from FIG. 2 for clarity.

In one embodiment, the client 250 operates under the direction and control of a user, who interacts with the client 250 via a user interface according to well-known techniques. The client 250 may execute a web browser 254 and/or another software application for enabling network communications. For illustrative purposes, the disclosed embodiments are described herein in terms of a request for a web page issued by a browser 254 running on the client 250. In one embodiment, the cache 252 is associated with the browser 254, although the cache 252 can be separate from the browser 254 and can be any local cache for use by the client 250.

The user interacts with the client 250, for example by typing URLs and/or clicking on links within the browser 254. In response to such actions, the client 250 makes requests of resources from the server 220. The stream manager 210 acts as an intermediary between the client 250 and the server 220, and may be configured to manage resources delivered to the client 250.

To this end, the stream manager 210 may be configured to prioritize streams. In an embodiment, the streams may be prioritized based on one or more precedence factors. In another embodiment, the stream manager 210 may be further configured to, but not limited to, determine dependencies in a priority tree as streams are added, adjust streaming when nodes are blocked, determine an effective weight for each stream based on its relative weight, and the like.

With respect to determining dependencies in a priority tree as streams are added, the stream manager 210 may be configured to identify, upon addition of a stream, a parent of the stream. In an embodiment, if the parent is unavailable (e.g., missing, closed, etc.), the stream manager 210 may be configured to add the stream as an immediate child of the root node. In a further embodiment, the stream manager 210 may be configured to determine the weight of the newly added stream to be equal to the average of the weights of all other immediate children of the root node. For example, if the parent of a new stream to be added is missing while direct children of the root node have weights of 8, 8, and 32, respectively, the new stream may be added as another direct child of the root node with a weight of 16.

With respect to adjusting streams when nodes are blocked, the stream manager 210 may be configured to identify blocked streams among the current set of degree relative streams before buffer filling. In an embodiment, when a blocked stream is identified, the stream manager 210 may be configured to add children of the blocked stream as immediate children of the root node, to identify an unblocked child stream of the added immediate children, and to send a frame to the unblocked child stream. In a further embodiment, the first identified unblocked child stream may be utilized regardless of whether other of the added immediate children are available.

In a further embodiment, if all children of the blocked stream are unavailable, the stream manager 210 may be configured to remove the blocked stream from the current degree relative set and to add it to a separate set of streams. The separate set of blocked streams may be processed after all unblocked streams have been fully processed. Adjusting streaming when nodes are blocked is described further herein below with respect to FIG. 5.

With respect to determining an effective weight for each stream, the stream manager 210 may be configured to identify a relative weight for each stream and to utilize the relative weights to determine the effective weights. Each effective weight is an absolute (as opposed to relative) value of the weight, i.e., a value that is meaningful without needing to be compared to other weights. In an embodiment, the effective weights may be determined based on a total buffer, based on a total number of frames sent during arbitrary cycles, and the like. In a further embodiment, the effective weights may be determined upon each creation of a buffer and/or immediately prior to each sending of frames, thereby allowing for real-time adjustments to changes in the tree. In yet a further embodiment, effective weights may be determined only for streams in the current degree relative set.

In an embodiment, determining an effective weight based on a total buffer includes identifying a total buffer size and filling a portion of the buffer for each stream at a particular level in the tree based on the stream's weight. If a stream is blocked, its children may fill sub-portions of the blocked stream's portion of the buffer. Thus, for each created buffer, all streams in the current degree relative set may be utilized to fill a portion of the total buffer.

Figure 3:
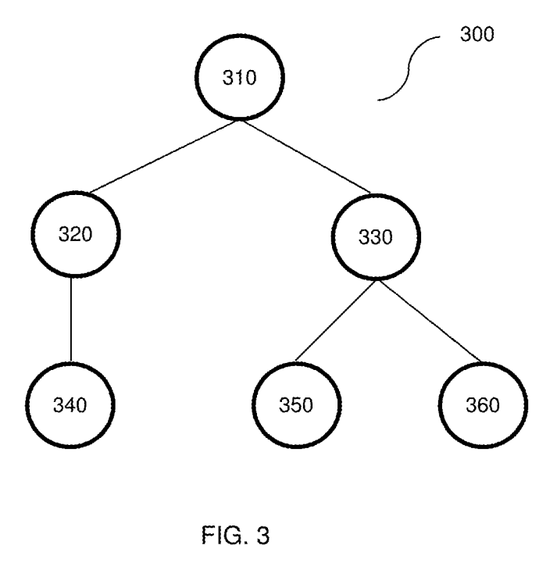
FIG. 3 is an example priority tree utilized to describe determining effective weights according to various embodiments.

FIG. 3 is an example priority tree 300 utilized to describe the process for determining effective weights according to various embodiments. The example priority tree 300 includes a root node 310 and dependent nodes 320 through 360 having relative weights 5, 15, 5, 10, and 20, respectively. Each node in the priority tree represents a stream of data.

The nodes 320 and 330 are first degree relative streams immediately dependent on the root node 310, while the nodes 340 through 360 are second degree relative streams, each immediately dependent on either node 320 or 330. In an example, when a total buffer to be filled is 64 KB, the effective weights for the node 320 and the node 330 may be 16 KB (64 KB*5/(5+15)) and 48 KB (64 KB*15/(5+15)), respectively. As another example, when the node 320 is unavailable, the 16 KB of the buffer to be filled by the node 320 may be redistributed to its child, the node 340. If the node 330 is unavailable, the 48 KB of the buffer to be filled by the node 330 may be redistributed to its children 350 and 360 in amounts of 16 KB (48 KB*10/(10+20)) and 32 KB (48 KB*20/(10+20)), respectively.

In another embodiment, an effective weight is determined based on frames sent per cycle. Such determination may include computing a total number of frames to be sent for each of a plurality of logical cycles (hereinafter, "iterations") and assigning a number of frames per iteration to each stream at a particular level in the tree based on its relative weight.

In an embodiment, the total number of frames sent per iteration may be determined based on the lowest relative weight among streams in a "degree relative set." The degree relative set defines weights for streams as a relative term. As an example, if streams in a degree relative set have relative weights of 3, 6, and 9, respectively, the stream having the lowest relative weight (3) may be assigned an effective weight of 1 frame per iteration. The other streams in the degree relative set may be assigned numbers of frames per iteration based on the relationship between their respective relative weights and the lowest relative weight (i.e., the stream having a relative weight of 6 is assigned 2 frames per iteration and the stream having a relative weight of 9 is assigned 3 frames per iteration). Thus, the total number of frames per iteration would be 6 frames per iteration.

In an embodiment, the size of each frame may be the maximum possible size given constraints of the stream such as, but not limited to, available data, window size, write buffer size, and the like. If a buffer is filled with frames for a first iteration and additional room remains in the buffer, additional frames for a second iteration may be further written for the buffer. In that case, the next created buffer will include the remaining frames from the second iteration.

Returning to FIG. 3, assume that the relative weights are 5, 10, 5, 10, and 20 for each of the nodes 320 through 360, respectively. When the nodes 320 and 330 are available, then the nodes 320 and 330 may be assigned 1 frame and 2 frames per iteration, respectively. If the nodes 320 and 330 are unavailable, the nodes 340 through 360 may be assigned 1 frame, 2 frames, and 4 frames per iteration, respectively.

As an example, if a size of a created buffer is 64 KB with a frame size of 16 KB, the buffer will include 1 frame (total 16 KB) for the node 320 and 2 frames (total 32 KB) for the node 330 in a first iteration. Since 16 KB of buffer remains, another frame for the node 320 may be written and included in the buffer. The remaining 2 frames for the node 330 may be included in the next created buffer.

As another example, if the nodes 320 and 330 are unavailable in the previous example, the buffer will include 1 frame (total 16 KB) for the node 340, 2 frames (total 32 KB) for the node 350, and 4 frames (total 64 KB) for the node 360. In this example, all of the frames for the nodes 340 and 350 are included in the first buffer, but only the first of the four frames for the node 360 are included in the first buffer. Thus, the iteration is only completed after a subsequent buffer has been created. It should be noted that, if a node is blocked, then its frames may be used for the first unblocked child node encountered during an iteration. Further, when such an unblocked node is encountered, then the blocked node is removed from the degree relative set.

In an embodiment, the stream manager 210 is configured to prioritize streams associated with a priority tree. The prioritization may be based on traversal of the tree (e.g., first degree relative set, then second degree relative set, . . . , then kth degree relative set) such that frames are sent only via the current degree relative set and/or immediate children thereof. Nodes of a degree relative set may be removed from the tree when blocked or otherwise unavailable such that, when all nodes of a degree relative set have become blocked or unavailable, the next degree relative set in the tree becomes the current degree relative set and frames are sent via its nodes.

In a further embodiment, for each buffer, each frame to be included in the buffer is assigned to an available stream having the next highest priority that requires frames to be written. The stream management unit 201 may be configured to stop frame assignment, for example, when the buffer becomes "full" (i.e., no more write buffer space) or when no more degree relative sets remain in the tree. If the buffer has become full, frame assignment may resume when a new buffer would be created.

In yet a further embodiment, the stream manager 210 may be configured to re-calculate, in real-time, the tree upon creation of each buffer and/or between sending of frames. This re-calculation allows the prioritization to be updated based on changes in the tree such as, but not limited to, closing of a stream, a stream becoming blocked, addition of new priorities, changes in amounts of information sent via the streams, and the like. In an embodiment, if the tree has not changed (e.g., if the re-calculated tree is identical to the original tree), filling of the buffer may resume based on the next highest priority node as of the last frame that was written, i.e., from the last location in the priority tree. If the tree has changed since the last buffer creation, the buffer filling may begin by traversing the re-calculated tree from the root node.

One skilled in the art should recognize that the particular arrangement of hardware elements shown in FIG. 2 is merely exemplary, and that the disclosed embodiments can be implemented using different hardware elements configured in any of a number of different ways. Thus, the particular architecture shown in FIG. 2 is merely illustrative and is not intended to limit the scope of the disclosure in any way.

One skilled in the art should also recognize that any number of devices, individually or in any combination, may be configured to fulfill the roles of the client 250 and/or the server 220 described herein without departing from the scope of the disclosed embodiments.

It should be noted that the stream manager 210 typically includes a processing system (PS) 212 coupled to a memory (mem) 214. The processing system 212 may comprise or be a component of a processor (not shown) or an array of processors coupled to the memory 214. The memory 214 contains instructions that can be executed by the processing system 212. The instructions, when executed by the processing unit 212, cause the processing system 212 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 4:
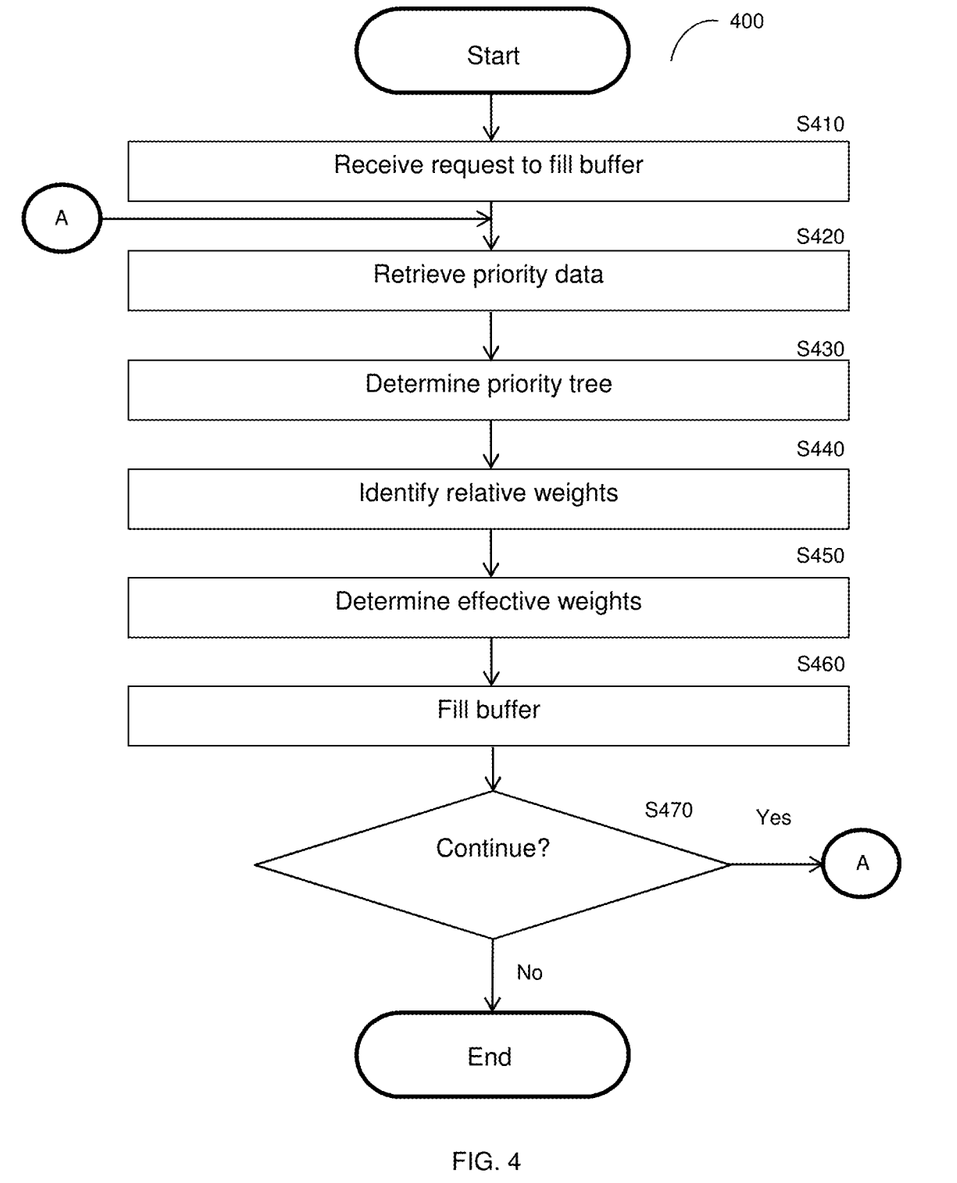
FIG. 4 is an example flowchart illustrating filling buffers according to an embodiment.

FIG. 4 is an example flowchart 400 illustrating a method for filling portions of a buffer according to an embodiment. In an embodiment, the method may be performed by the stream manager 210.

At S410, a request to fill a buffer is received. In an embodiment, the request may further include a request to create a buffer. The request can be triggered by periodic events.

At S420, priority data of a priority tree are received or retrieved. The priority data may include, but is not limited to, a dependency, a relative weight, and/or exclusivity of a node. In an embodiment, such priority data is embedded or included in HEADERs and/or PRIORITY frames.

At S430, a priority tree is determined. The priority tree may be determined based on, e.g., the priority data. To this end, S420 may further include identifying dependencies and exclusivity of each node based on the priority data.

At S440, a relative weight of each node is identified. The identification may be based on the priority data.

At S450, effective weights are determined based on the relative weights and/or the total buffer. The determined effective weights may be expressed as portions of the total buffer (e.g., 32 KB) or as a number of frames per iteration (e.g., 2 frames/iteration). The size of each frame may be the maximum frame size possible given various constraints. In an embodiment, the effective weights may only be determined for a current degree relative set.

At S460, the buffer is filled based on the determined effective weights. The filling may be by streams in the current degree relative set. The filling may include, but is not limited to, writing frames to be included in the buffer. If the effective weights are portions of the total buffer, each stream may be assigned one or more frames including its effective weight. If the effective weights are numbers of frames per iteration, each stream may be assigned a number of frames equal to its effective weight or a multiple thereof. Filling a buffer based on effective weights expressed as frames per iteration is described further herein below with respect to FIG. 6.

In an embodiment, S460 may further include determining if any streams with which the buffer would be filled are blocked or otherwise unavailable and, if so, adjusting streaming accordingly.

Figure 5:
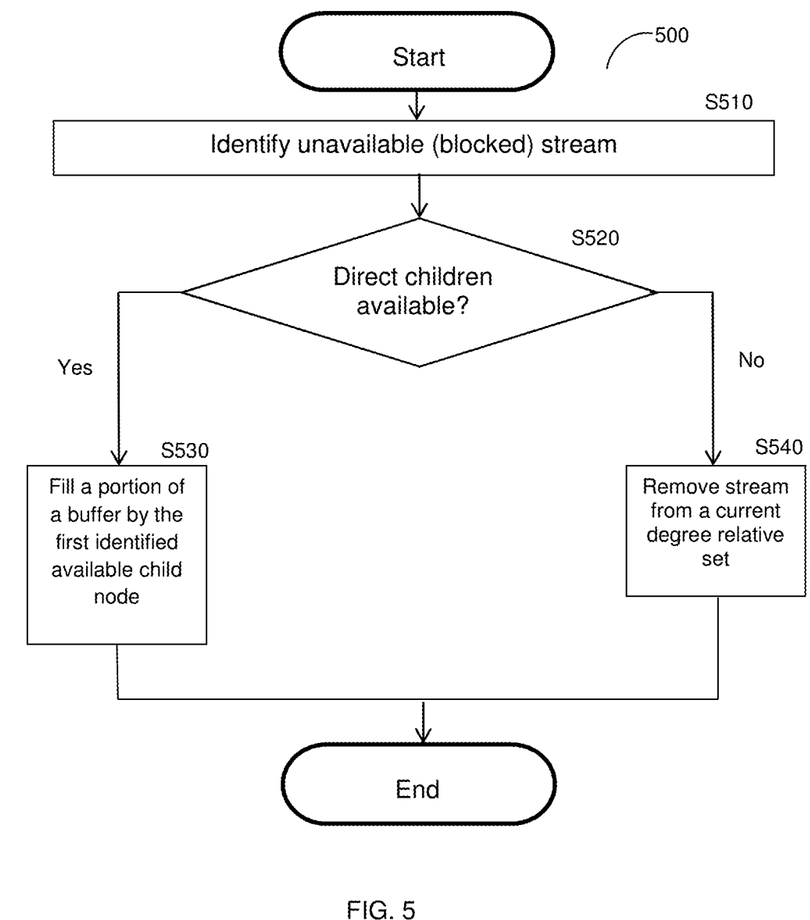
FIG. 5 is an example flowchart illustrating a method for adjusting streaming for unavailable nodes according to an embodiment.

FIG. 5 is an example flowchart 500 illustrating a method for adjusting streaming to accommodate unavailable nodes according to an embodiment. At S510, a blocked, closed, missing, or otherwise unavailable node is identified among the current degree relative set. A node may be blocked or unavailable if, for example, part or all of the group of headers for the stream have not been received, a client size window for the stream is 0 but its backend connection includes data, its backend internal buffer is empty, and the like.

At S520, it is determined whether at least one immediate child node of the detected unavailable node is available and, if so, execution continues with S530; otherwise, execution continues with S540. S520 may include traversing the priority tree to detect immediate children nodes. At S530, the portion of the buffer to be filled by the unavailable node is instead filled by the first identified available child node. In an embodiment, S530 may further include adding each immediate child of the unavailable node to the current degree relative set.

At S540, upon determining that none of the immediate children of the unavailable stream are available, the unavailable stream is removed from the current degree relative set and added to an isolated stream set. The isolated stream set is typically processed after all other streams in the current degree relative set have been processed.

It should be noted that adjusting for unavailable streams is not limited to the particular method described herein above with respect to FIG. 5. Other methods of adjusting for unavailable streams may be utilized without departing from the scope of the disclosure.

Returning to FIG. 4, at S470, it is determined if additional streams are to be served and/or if the buffer is not full and, if so, execution continues with S410; otherwise, execution terminates.

Figure 6:
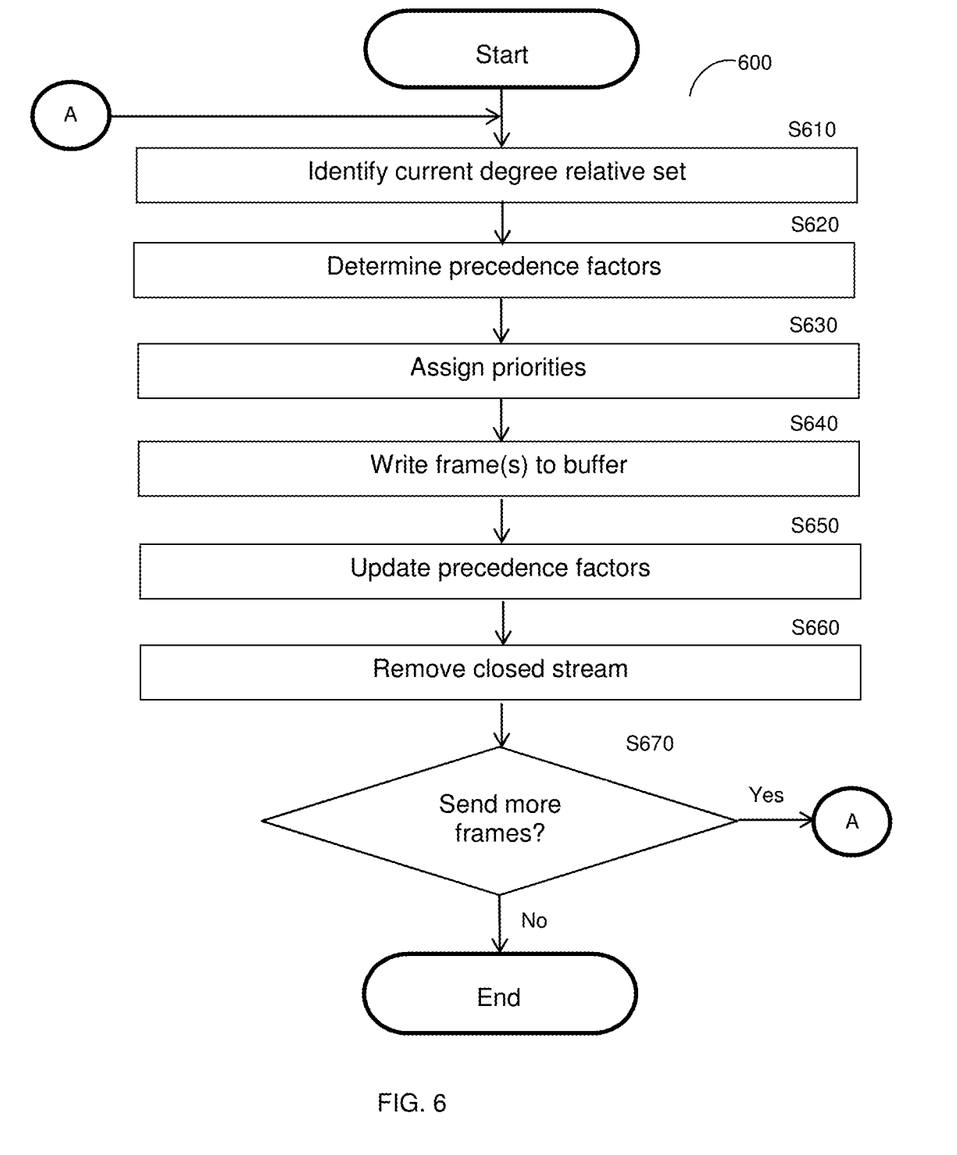
FIG. 6 is an example flowchart illustrating a method for filling a buffer based on numbers of frames per iteration according to an embodiment.

FIG. 6 is an example flowchart 600 illustrating a method for filling a buffer based on numbers of frames per iteration according to an embodiment. In an embodiment, the method may be performed at, e.g., step S460. Each iteration may be a cycle for each stream in a set of streams (e.g., a degree relative set) in which a number of frames is provided to the stream based on the stream's effective weight. An iteration may be completed in a single buffer, or may be completed across multiple buffers. Iterations and effective weights based on numbers of frames per iteration are described further herein above with respect to FIG. 2.

In an embodiment, the effective weight of a stream may be determined to be the quotient of the relative weight of the stream by the minimum relative weight of the set of streams. In a further embodiment, the effective weight may be rounded to the nearest integer. In yet a further embodiment, if the effective weight of a stream is calculated to be 0, the effective weight of the stream may be determined as 1 frame/iteration. In another embodiment, effective weights may be calculated for each stream of the current degree relative set when a new degree relative set becomes the current degree relative set.

At S610, a current degree relative set of streams in a priority tree is identified. In an embodiment, the current degree relative set may be the first level current degree relative set (i.e., the set including the immediate child streams of the root node of the tree). In another embodiment, the current degree relative set of streams may be the first level in the tree including available streams. In an embodiment, S610 may further include identifying effective weights for streams of the current degree relative set. The effective weights are expressed as numbers of frames per iteration.

At S620, precedence factors for streams in the current degree relative set are determined. The precedence factors may be utilized to determine a precedence relation between each pair of the streams and, consequently, a prioritization of the streams respective of each other. The precedence relation between any two streams may be expressed via a comparative operator (e.g., less than, equal to, greater than, etc.).

In an embodiment, the precedence factors for a stream may include, but are not limited to, whether the stream has a special designated priority, a number of frames sent, an effective weight, an iteration counter, and a combination thereof. Whether a stream has special designated priority may be utilized, for example, to assign the highest priority to streams fulfilling a predetermined condition. For example, a stream may have super priority if headers for the stream have not yet been sent and, once headers for the stream are sent, the stream does not have super priority. The number of frames sent precedence factor indicates a number of frames sent by the stream in a current iteration. The effective weight precedence factor indicates the total number of frames to be sent per iteration. The iteration counter precedence factor may represent a number of iterations completed by the stream. The iteration counter may be increased by 1 each time the number of frames sent by the stream in the current iteration reaches the effective weight.

At S630, a priority is assigned to each stream of the current degree relative set respective of other streams in the current degree relative set based on the precedence factors. In an embodiment, the priorities may be determined based on comparisons between the precedence factors. In another embodiment, a first stream may be assigned a higher priority than a second stream if a precedence factor (or a sum or difference of precedence factors) of the first stream is lower than a corresponding precedence factor of the second stream. For example, if the number of frames sent by stream A is less than the number of frames sent by stream B during the current iteration, stream A may be assigned a higher priority.

In yet another embodiment, the precedence factors may be ranked. In yet a further embodiment, lower ranked precedence factors for streams are only compared if higher ranked precedence factors for the streams are equal. As a non-limiting example, if two streams both have special designated priority factors, the iteration counters for the streams may be compared. If the iteration counters are equal, the effective weights and/or numbers of frames sent during a current iteration for the streams may be compared. The effective weights and numbers of frames sent during the current iteration may be compared separately (e.g., with one having a higher ranking than the other) or jointly (e.g., by comparing difference values between these factors for the streams).

At S640, a frame is written on the highest priority stream in the current degree relative set. In an embodiment, if the highest priority stream is blocked or unavailable, the streaming may be adjusted, e.g., as described herein above with respect to FIG. 5.

At S650, if a frame was written successfully, the precedence factors of the highest priority stream may be updated. The updates may include, but are not limited to, adjusting one or more priority factors, increasing the number of frames written to the buffer, increasing the iteration counter, and so on.

At optional S660, if the highest priority stream has become closed, i.e., no more frames are required for the stream, the closed stream may be removed from the tree, thereby removing it from the current degree relative set. Such removal may reduce further calculations and/or traversal, thereby conserving computing resources. In an embodiment, removing the closed stream may include, but is not limited to, removing the closed stream from a list of children of the closed stream's parent, adding each child of the closed stream as a child of the closed stream's parent, determining precedence factors for the added child streams, deleting the closed stream from the tree, and resetting the node of the deleted stream. Thus, when an entire set of initially degree relative streams is closed, the children of those degree relative streams may become immediately dependent on the root node, thereby removing the need to track node genealogy of closed nodes and, consequently, reducing usage of computing resources and/or accelerating buffer filling.

At S670, it is determined whether additional frames must be written and, if so, execution continues with S610; otherwise, execution terminates. In an embodiment, it may be determined that additional frames do not need to be written if, e.g., no more available nodes are in the tree, all required frames have been written, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for optimized stream management, comprising:
    retrieving priority data;
    determining, in real-time, a current priority tree based on the retrieved priority data, wherein the priority tree includes at least one node representing a stream and has at least a first level;
    identifying, based on the retrieved priority data, at least one relative weight of the at least one node;
    determining an effective weight based on each identified relative weight, wherein an effective weight is an absolute value of a weight in that its value is meaningful without needing to be compared to a value of any other weight; and
    filling a buffer based on the current priority tree and the at least one effective weight.

2. The method of claim 1, wherein the buffer is filled based on dependencies of the at least one node from a root node of the current priority tree.

3. The method of claim 2, further comprising:
    identifying an unavailable node in a current degree relative set, wherein the current degree relative set includes nodes of the first level in the priority tree having at least one available node; and
    adjusting streaming based on the identified unavailable node.

4. The method of claim 3, wherein adjusting streaming based on the identified unavailable node further comprises:
    determining whether any immediate child node of the unavailable node is available, wherein the buffer is at least partially filled with at least one available immediate child node when it is determined that any immediate child node of the unavailable node, which yet remains in the tree, is available.

5. The method of claim 4, further comprising:
    removing the unavailable node from the current dependent relative set, upon determining that no immediate children nodes of the unavailable node are available.

6. The method of claim 4, further comprising:
    adding the available at least one immediate child node to the current degree relative set, when it is determined that any immediate child node of the unavailable node is available.

7. The method of claim 1, wherein each effective weight is based on a total size of the buffer or based on a number of frames sent per cycle.

8. The method of claim 1, further comprising:
    determining a new current priority tree upon any of: creation of a new buffer, and partial filling of the buffer.

9. The method of claim 1, further comprising:
    identifying a current degree relative set, wherein the current degree relative set includes nodes of the first level in the priority tree having at least one available node; and
    assigning a priority to each stream represented in the current degree relative set based on at least one precedence factor, wherein the buffer is filled based on the assigned priorities.

10. The method of claim 9, wherein each precedence factor is any of: a special designated priority, a number of frames sent by the stream, an effective weight, and an iteration counter.

11. A non-transitory computer readable medium having stored thereon instructions for causing one or more processing units to execute the method according to claim 1.

12. A system for optimized stream management, comprising:
    a processing unit; and
    a memory, the memory containing instructions that, when executed by the processing unit, configure the system to:
    retrieve priority data;
    determine, in real-time, a current priority tree based on the retrieved priority data, wherein the priority tree includes at least one node representing a stream and has at least a first level;
    identify, based on the retrieved priority data, at least one relative weight of the at least one node;

determine an effective weight based on each identified relative weight, wherein an effective weight is an absolute value of a weight in that its value is meaningful without needing to be compared to a value of any other weight; and fill a buffer based on the current priority tree and the at least one effective weight.

13. The system of claim 12, wherein the buffer is filled based on dependencies of the at least one node from a root node of the current priority tree.

14. The system of claim 13, wherein the system is further configured to:

identify an unavailable node in a current degree relative set, wherein the current degree relative set includes nodes of the first level in the priority tree having at least one available node; and adjust streaming based on the identified unavailable node.

15. The system of claim 14, wherein the system is further configured to:

determine whether any immediate child node of the unavailable node is available, wherein the buffer is at least partially filled with at least one available immediate child node when it is determined that any immediate child node of the unavailable node, which yet remains in the tree, is available.

16. The system of claim 15, wherein the system is further configured to:

remove the unavailable node from the current dependent relative set, upon determining that no immediate children nodes of the unavailable node are available.

17. The system of claim 15, wherein the system is further configured to:

add the available at least one immediate child node to the current degree relative set, when it is determined that any immediate child node of the unavailable node is available.

18. The system of claim 12, wherein each effective weight is based on a total size of the buffer or based on a number of frames sent per cycle.

19. The system of claim 12, wherein the system is further configured to:

determine a new current priority tree upon any of: creation of a new buffer, and partial filling of the buffer.

20. The system of claim 12, wherein the system is further configured to:

identify a current degree relative set, wherein the current degree relative set includes nodes of the first level in the priority tree having at least one available node; and assign a priority to each stream represented in the current degree relative set based on at least one precedence factor, wherein the buffer is filled based on the assigned priorities.

21. The system of claim 20, wherein each precedence factor is any of: a special designated priority, a number of frames sent by the stream, an effective weight, and an iteration counter.

* * * * *